(12) United States Patent
Adema et al.

(10) Patent No.: US 12,313,855 B2
(45) Date of Patent: May 27, 2025

(54) SYSTEMS AND METHODS TO SEPARATE SCANNING MIRROR INPUT AND OUTPUT LIGHT

(71) Applicant: GOOGLE LLC, Mountain View, CA (US)

(72) Inventors: Daniel Adema, Kitchener (CA); Ian Andrews, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 651 days.

(21) Appl. No.: 17/581,414

(22) Filed: Jan. 21, 2022

(65) Prior Publication Data

US 2022/0269099 A1    Aug. 25, 2022

Related U.S. Application Data

(60) Provisional application No. 63/140,571, filed on Jan. 22, 2021.

(51) Int. Cl.
| | |
|---|---|
| *G02B 26/08* | (2006.01) |
| *G02B 17/02* | (2006.01) |
| *G02B 26/10* | (2006.01) |
| *G02B 27/01* | (2006.01) |
| *G02B 27/28* | (2006.01) |

(52) U.S. Cl.
CPC ........... *G02B 27/286* (2013.01); *G02B 17/02* (2013.01); *G02B 26/0833* (2013.01); *G02B 26/101* (2013.01); *G02B 27/0172* (2013.01); *G02B 27/283* (2013.01); *G02B 2027/0178* (2013.01)

(58) Field of Classification Search
CPC .. G02B 27/286; G02B 17/02; G02B 26/0833; G02B 26/101; G02B 27/0172; G02B 27/283; G02B 2027/0178
See application file for complete search history.

(56) References Cited

U.S. PATENT DOCUMENTS

| | | |
|---|---|---|
| 2016/0170215 A1 | 6/2016 | Mukawa et al. |
| 2020/0026065 A1* | 1/2020 | Viswanathan ..... G02B 26/0833 |
| 2020/0026072 A1 | 1/2020 | Brown et al. |

OTHER PUBLICATIONS

Sigmakoki CO.,LTD 'Waveplate Application Note', https://www.global-optosigma.com/en_jp/category/opt/opt07.html#:~:text=The%20light%20passes%20through%20the,passed%20through%20the%20quarter%20waveplate, date of downloading Sep. 22, 2020, 4 pages.

* cited by examiner

*Primary Examiner* — Euncha P Cherry

(57) ABSTRACT

Systems and methods of separating the input light path from the output light path of a scanning mirror in a laser projector system while keeping the overall footprint of the laser projector system to a minimum. The system includes a scanning mirror, an optical engine, and an input/output (I/O) separator disposed between the optical engine and the scanning mirror to direct light from the optical engine towards the scanning mirror along an input path and to direct light reflected from the scanning mirror along an output path. The I/O separator, disposed to intersect both the input and output paths, can be implemented as a prism or a combination of a polarizing beam splitter and a quarter wave plate.

20 Claims, 8 Drawing Sheets

SYSTEMS AND METHODS TO SEPARATE SCANNING MIRROR INPUT AND OUTPUT LIGHT

CROSS-REFERENCE TO RELATED APPLICATIONS

The present application claims priority to U.S. Provisional Patent Application Ser. No. 63/140,571, entitled "SYSTEMS AND METHODS TO SEPARATE SCANNING MIRROR INPUT AND OUTPUT LIGHT" and filed on Jan. 22, 2021, the entirety of which is incorporated by reference herein.

BACKGROUND

Laser projectors are devices that project manipulated laser beams onto a surface for viewing, usually as images or text. Conventional scanning laser projectors generally include mirrors, actuators, and other optical components that function to manipulate the optical path and properties of laser light emitted from laser diodes. Each of the laser diodes of a laser projector emits a laser light beam of a specific wavelength, typically corresponding to a single color (e.g., red, green, or blue light). The light from the lasers is then combined with dichroic elements into a single beam. The beam is then relayed onto a scanning mirror that scans the beam in a raster pattern. The projected image is created by modulating the lasers synchronously with the position of the scanned beam.

Laser projectors can produce a much brighter projected image because the laser diodes of a laser projector produce only the colors needed compared to traditional projectors using light sources that emit white light that must then be filtered into the individual colors and then recombined when projected. This also makes laser projectors highly efficient, as energy is not wasted producing colors of light that will ultimately be filtered out during the projection process. Thus, laser projectors are utilized in various applications, from heads-up displays for vehicles to wearable head-mounted displays (HMDs) designed to allow users to experience virtual and augmented reality.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
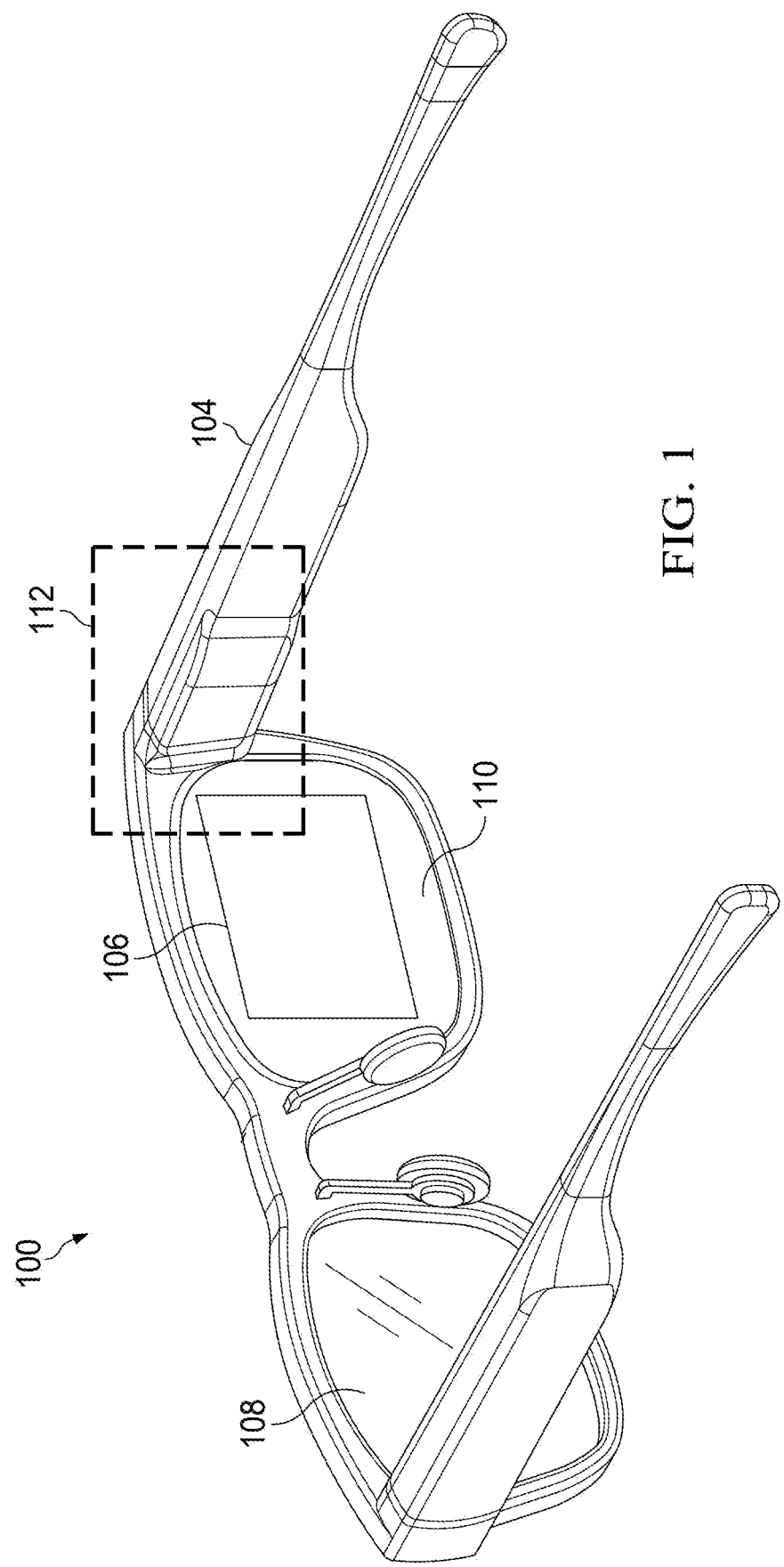
FIG. 1 shows an example display system housing a laser projector system configured to project images toward the eye of a user, in accordance with some embodiments.

Some HMDs are designed to look like eyeglasses, with at least one of the lenses containing a waveguide to direct light to a user's eye. The combination of the lens and waveguide is referred to as a "combiner". The HMD generally has a frame designed to be worn in front of a user's eyes to allow the user to view both their environment and computer-generated content projected from the combiner. Components which are necessary to the functioning of a typical HMD, such as, for example, a light engine to project computer-generated content, cameras to pinpoint physical location, cameras to track the movement of the user's eye(s), processors to power the light engine, and a power supply, are typically housed within the frame of the HMD. As an HMD frame has limited volume in which to accommodate these components, it is desirable that these components be as small as possible and configured to interact with the other components in very small volumes of space.

An HMD that employs a laser projector typically includes at least one scanning mirror controlled by a microelectromechanical system (MEMS) to direct light within the system. Light that is incident on a scanning MEMS mirror ("scanning mirror") travels along an optical input path and the light that is subsequently reflected from the scanning mirror travels along an optical output path. To prevent the incident light from interfering with the reflected light, the input and output optical paths from a scanning MEMS mirror are typically separated by an angle, resulting in longer optical paths. This can have a significant impact on the size of the laser projector system and, consequently, on the overall size of the HMD. Additionally, the angled input of the light incident on the scanning mirror reduces the effective maximum beam size that can be reflected off the scanning mirror (i.e., the projected mirror size=mirror size*sine (angle from the mirror normal)). One method of reducing the angle required to separate the input and output optical paths from a scanning mirror is to reduce the laser beam size, which is typically not desirable, as the scanning mirror size is often the limiting aperture of the system, and reducing the beam size reduces brightness of the content projected to the user. Additionally, reducing the beam size can decrease the system resolution.

FIGS. 1-12 illustrate systems and methods of separating the input light path from the output light path of a scanning mirror in a laser projector system while keeping the overall footprint of the laser projector system to a minimum. In some embodiments, an input/output (I/O) separator utilizes at least one prism to separate the input and output paths of light in a laser projector system. The prism is disposed between the scanning mirror and the optical relay and is configured to have an angled surface in the light paths of both the input light provided to the scanning mirror and the output light reflected from the scanning mirror. The angle at the surface of the prism proximate to the scanning mirror and optical relay is configured to reflect input light by total internal reflection (TIR) while allowing output light from the scanning mirror to be transmitted through the prism to the optical relay. That is, input light is incident on the angled surface of the prism at an angle that is greater than the critical angle needed for TIR of the input light and, thus, the input light is directed from the angled surface of the prism to the scanning mirror by TIR. However, the light output from the scanning mirror is incident on the angled surface of the prism at an angle less than the critical angle for TIR and, thus, the output light does not TIR from the angled prism surface and is, instead, transmitted through the prism to the optical relay. Consequently, the paths of the input and output light are kept separate from one another.

In some embodiments, the I/O separator utilizes a polarization beam splitter (PBS) and at least one quarter wave plate (QWP) to separate the input and output paths of light in a laser projector system. The PBS is configured to reflect light input into the I/O separator having a first polarization state and to transmit light having a second polarization state. Thus, light having the first polarization state is input into the I/O separator and is reflected at the PBS towards a scanning mirror. The QWP is positioned between the PBS and the scanning mirror to change the polarization of the light reflected from the scanning mirror so that it has the second polarization state and will be transmitted through the PBS when incident upon the PBS a second time as it travels along the output path from the scanning mirror. That is, the light provided to the scanning mirror is first reflected from the PBS before being reflected by the scanning mirror and then the light is transmitted through the PBS layer after being reflected by the scanning mirror. By manipulating the polarization state of the light, the input path of the light being provided to the scanning mirror is separated from the output path of the light as it is reflected from the scanning mirror.

FIG. 1 illustrates an example display system 100 employing a laser projector system in which an I/O separator, described in greater detail below, is used to separate optical input and output paths. The display system 100 has a support structure 102 that includes an arm 104, which houses a laser projector system configured to project images toward the eye of a user, such that the user perceives the projected images as being displayed in a field of view (FOV) area 106 of a display at one or both of lens elements 108, 110. In the depicted embodiment, the display system 100 is a wearable heads-up display (WHUD) that includes a support structure 102 configured to be worn on the head of a user and has a general shape and appearance of an eyeglasses (e.g., sunglasses) frame. The support structure 102 contains or otherwise includes various components to facilitate the projection of such images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like.

The support structure 102 further can include one or more radio frequency (RF) interfaces or other wireless interfaces, such as a Bluetooth™ interface, a WiFi interface, and the like. Further, in some embodiments, the support structure 102 further includes one or more batteries or other portable power sources for supplying power to the electrical components of the display system 100. In some embodiments, some or all of these components of the display system 100 are fully or partially contained within an inner volume of support structure 102, such as within arm 104 in region 112 of the support structure 102. It should be noted that while an example form factor is depicted, it will be appreciated that the display system 100 may have a different shape and appearance from the eyeglasses frame depicted in FIG. 1.

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images is projected by a laser projector of the display system 100 onto the eye of the user via a series of optical elements, such as a waveguide formed at least partially in the corresponding lens element, one or more scanning mirrors, and one or more optical relays. One or both of the lens elements 108, 110 thus include at least a portion of a waveguide that routes display light received by an incoupler of the waveguide to an outcoupler of the waveguide, which outputs the display light toward an eye of the user of the display system 100. The display light is modulated and scanned across the eye of the user such that the user perceives the display light as an image. In addition, each of the lens elements 108, 110 is sufficiently transparent to allow a user to see through to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more LEDs and a dynamic reflector mechanism such as one or more dynamic scanners or digital light processors. In some embodiments, the projector includes multiple laser diodes (e.g., a red laser diode, a green laser diode, and/or a blue laser diode) and at least one scanning mirror (e.g., two one-dimensional scanning mirrors, which may be micro-electromechanical system (MEMS)-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV 106 to accommodate the outcoupling of light across a wide range of angles. The range of different user eye positions that will be able to see the display is referred to as the eyebox of the display.

In some embodiments, the projector routes light via first and second scanning mirrors, an optical relay disposed between the first and second scanning mirrors, and a waveguide disposed at the output of the second scanning mirror. In some embodiments, at least a portion of an outcoupler of the waveguide may overlap the FOV area 106. These aspects are described in greater detail below.

Figure 2:
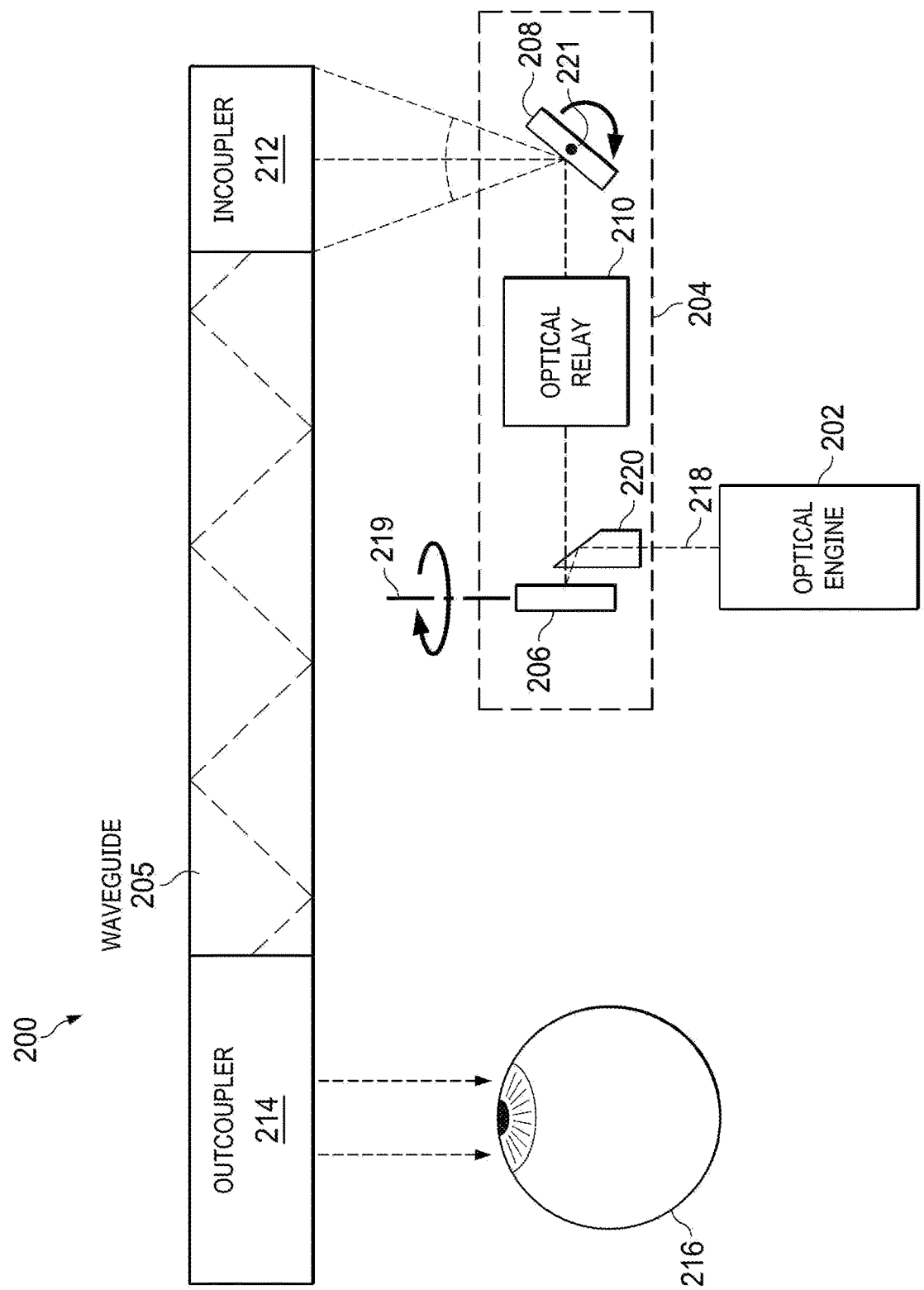
FIG. 2 shows a block diagram of a laser projector system usable in the display system of FIG. 1, in accordance with some embodiments.

FIG. 2 illustrates a block diagram of a laser projector system 200 that projects images directly onto the eye of a user via laser light. The laser projector system 200 includes an optical engine 202, an optical scanner 204, and a waveguide 205. The optical scanner 204 includes an input/output separator (I/O separator) 220, the first scanning mirror 206, a second scanning mirror 208, and an optical relay 210. The waveguide 205 includes an incoupler 212 and an outcoupler 214, with the outcoupler 214 being optically aligned with an eye 216 of a user in the present example. In some embodiments, the laser projector system 200 is implemented in a wearable heads-up display or other display system, such as the display system 100 of FIG. 1.

The optical engine 202 includes one or more laser light sources configured to generate and output laser light 218 (e.g., visible laser light such as red, blue, and green laser light and/or non-visible laser light such as infrared laser light). In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the laser light 218 to be perceived as images when output to the retina of an eye 216 of a user.

For example, during operation of the laser projector system 200, multiple laser light beams having respectively different wavelengths are output by the laser light sources of the optical engine 202, then combined via a beam combiner (not shown), before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

One or both of the scanning mirrors 206 and 208 of the optical scanner 204 are MEMS mirrors in some embodiments. For example, the scanning mirror 206 and the scanning mirror 208 are MEMS mirrors that are driven by respective actuation voltages to oscillate during active operation of the laser projector system 200, causing the scanning mirrors 206 and 208 to scan the laser light 218. Oscillation of the scanning mirror 206 causes laser light 218 output by the optical engine 202 to be scanned through the optical relay 210 and across a surface of the second scanning mirror 208. The second scanning mirror 208 scans the laser light 218 received from the scanning mirror 206 toward an incoupler 212 of the waveguide 205. In some embodiments, the scanning mirror 206 oscillates along a first scanning axis, such that the laser light 218 is scanned in only one dimension (i.e., in a line) across the surface of the second scanning mirror 208. In some embodiments, the scanning mirror 208 oscillates or otherwise rotates along a second scanning axis that is perpendicular to the first scanning axis.

In some embodiments, the incoupler 212 has a substantially rectangular profile and is configured to receive the laser light 218 and direct the laser light 218 into the waveguide 205. The incoupler 212 is defined by a smaller dimension (i.e., width) and a larger orthogonal dimension (i.e., length). In an embodiment, the optical relay 210 is a line-scan optical relay that receives the laser light 218 scanned in a first dimension by the first scanning mirror (e.g., the first dimension corresponding to the small dimension of the incoupler 212), routes the laser light 218 to the second scanning mirror 208, and introduces a convergence to the laser light 218 in the first dimension. The second scanning mirror 208 receives the converging laser light 218 and scans the laser light 218 in a second dimension, the second dimension corresponding to the long dimension of the incoupler 212 of the waveguide 205. In some embodiments, the second scanning mirror 208 causes the laser light 218 to converge to a focal line along the second dimension. In some embodiments, the incoupler 212 is positioned at or near the focal line downstream from the second scanning mirror 208 such that the second scanning mirror 208 scans the laser light 218 as a line or row over the incoupler 212.

The waveguide 205 of the laser projector system 200 includes the incoupler 212 and the outcoupler 214. The term "waveguide," as used herein, will be understood to mean a combiner using one or more of total internal reflection (TIR), specialized filters, and/or reflective surfaces, to transfer light from an incoupler (such as the incoupler 212) to an outcoupler (such as the outcoupler 214). In the present example, the laser light 218 received at the incoupler 212 is relayed to the outcoupler 214 via the waveguide 205 using TIR. The laser light 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing the laser projector system 200.

In the optical path between the optical engine 202 and scanning mirror 206, an I/O separator 220 is positioned to separate the path of the light from the optical engine 202 that is provided to scanning mirror 206 from the path of the light reflected from scanning mirror 206 before it enters the optical relay 210. Although not shown in the example of FIG. 2, in some embodiments additional optical components are included in any of the optical paths between the optical engine 202 and the scanning mirror 206, between the scanning mirror 206 and the optical relay 210, between the optical relay 210 and the scanning mirror 208, between the scanning mirror 208 and the incoupler 212, between the incoupler 212 and the outcoupler 214, and/or between the outcoupler 214 and the eye 216 (e.g., in order to shape the laser light for viewing by the eye 216 of the user).

Figure 3:
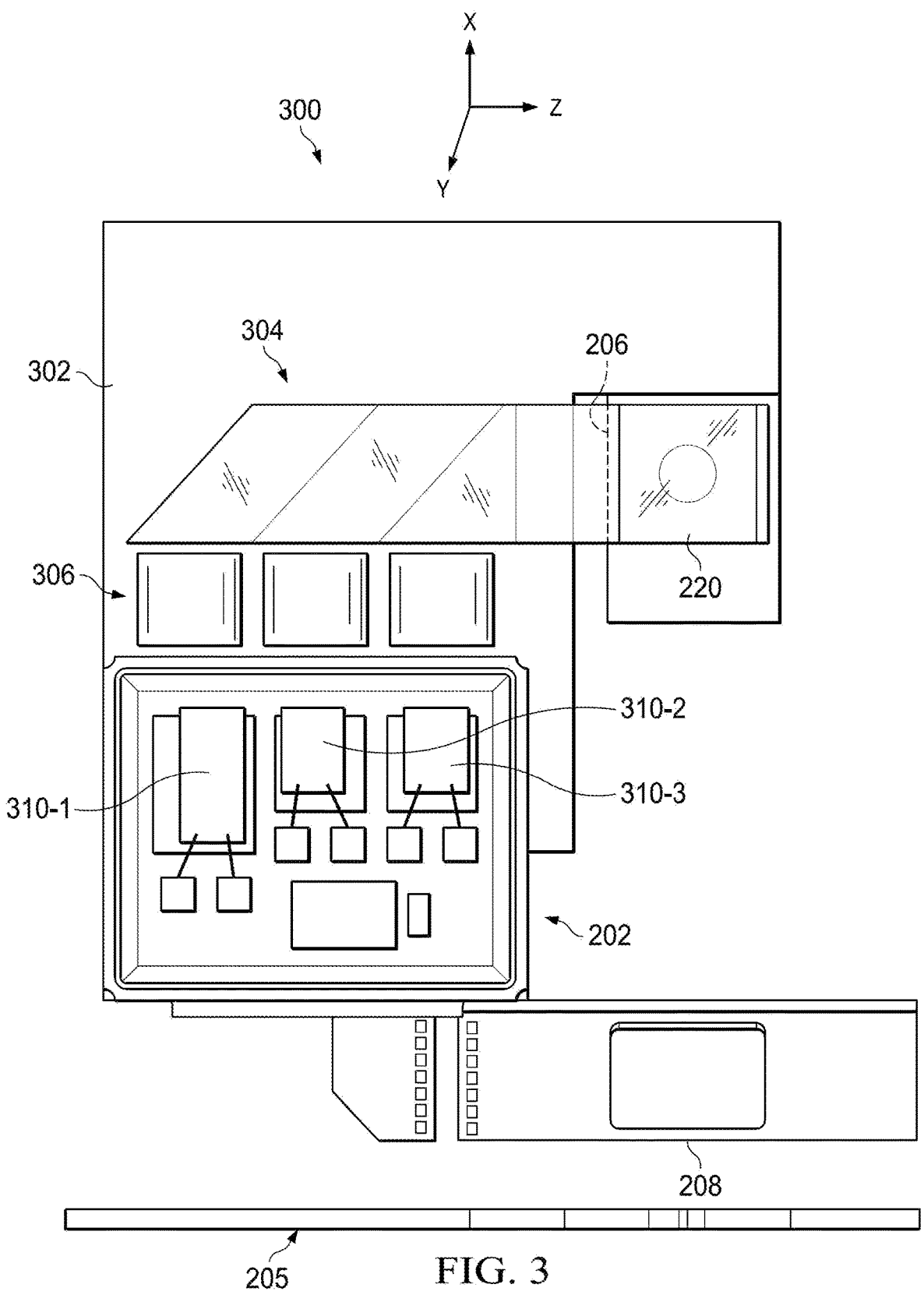
FIG. 3 shows a perspective view of an embodiment of an optical engine of a laser projector system, such as the laser projector system of FIG. 2, in which an input/output (I/O) separator is employed, in accordance with some embodiments.

FIG. 3 shows a perspective view 300 of an embodiment of an optical engine, such as optical engine 202 of FIG. 2, in which an I/O separator is employed, such as I/O separator 220 of FIG. 2, or any of the I/O separators illustrated in FIGS. 5-12. As shown, the optical engine 202 includes a substrate 302 on which are disposed primary lenses 306 and a monoblock 304 which functions as a beam combiner to combine multiple beams of light into a combined beam.

According to various embodiments, the substrate 302 is a printed circuit board (PCB) or otherwise another applicable substrate.

The optical engine 202 comprises a set of one or more laser light sources 310 (e.g., laser diodes), such as the illustrated red laser light source 310-1, green laser light source 310-2, and blue laser light source 310-3, wherein a processor or other controller operates the optical engine 202 to modulate the respective intensity of each laser light source 310 so as to provide a corresponding red light, green light, and blue light contribution to a corresponding pixel of an image being generated for display to the user. The primary lenses 306 includes a corresponding number of collimation lenses (e.g., three for the three laser light sources 310 in the example above), each interposed in the light path between a respective laser light source 310 of the optical engine 202 and the monoblock 304. For example, each laser light source 310 outputs a different wavelength of laser light (e.g., corresponding to respective red, blue, and green wavelengths) through the primary lenses 306 to be combined at the monoblock 304 to produce the laser light (i.e., laser light 218 shown in FIG. 2) to be projected by the laser projector system 200.

The monoblock 304 receives the individual laser light inputs and outputs a combined laser light 218 to the I/O separator 220, which redirects the laser light 218 to scanning mirror 206. The scanning mirror 206 scans the laser light 218 back through the I/O separator 220 and into the optical relay 210 across a first scanning axis. A benefit of the illustrated configuration is that, because the input light can be perpendicular (or nearly perpendicular) to the scanning mirror, the full aperture of the mirror can be used, allowing a larger laser spot (i.e., more optical power) to be scanned. Alternatively, a smaller aperture mirror can be used, which would save electrical power because a lower mirror mass uses less driving electrical power.

Figure 4:
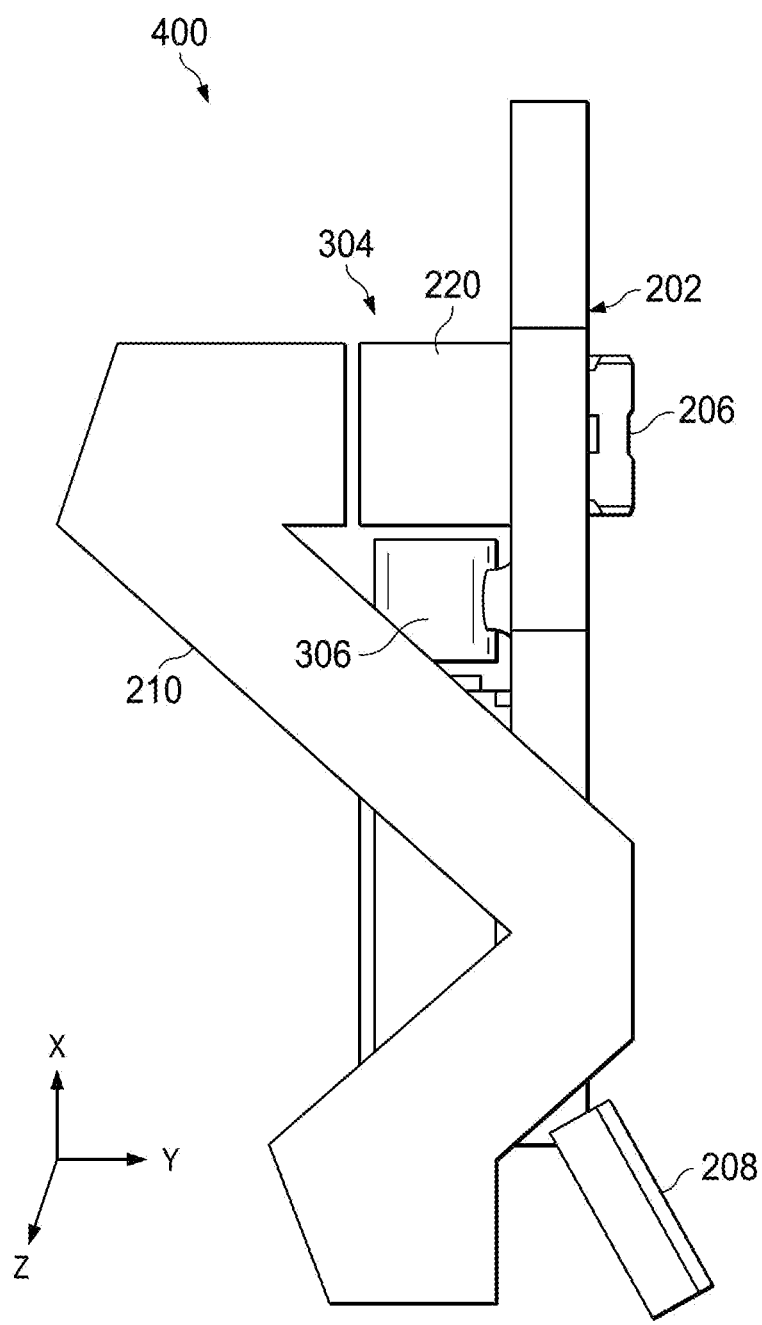
FIG. 4 shows a top view of the optical engine of FIG. 3, including an optical relay, in accordance with some embodiments.

FIG. 4 shows a top view 400 of optical engine 202 of FIG. 3, including optical relay 210. Optical relay 210 is a molded reflective relay, which may be, for example, molded from a solid clear component (e.g., glass or an optical plastic such as Zeonex) and the reflective surfaces thereof are implemented as mirror coatings, TIR surfaces, or metasurfaces. Such molding can simplify fabrication of the laser projector system 200, as it facilitates the incorporation of many or all of the optical surfaces of the relay into a single element, rather than several distinct, separate elements. The optical relay 210 is configured to route the laser light 218 from scanning mirror 206 toward scanning mirror 208. The scanning mirror 208 scans the laser light 218 across the incoupler (such as the incoupler 212) of the waveguide 205 along a second scanning axis that is perpendicular to the first scanning axis.

Figure 5:
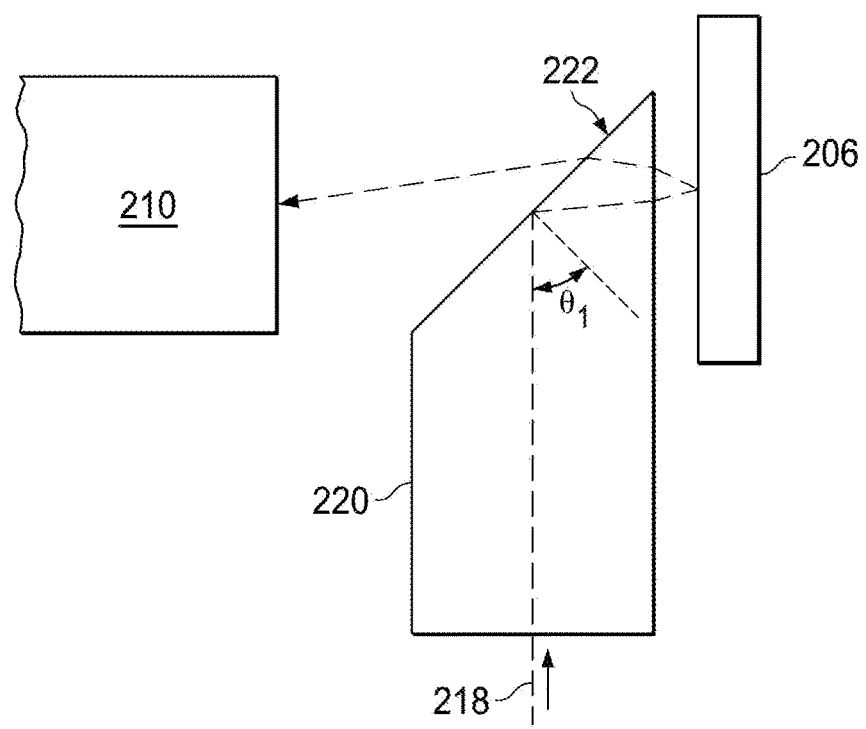
FIG. 5 shows an embodiment of an I/O separator as employed in an optical engine, such as the optical engine of FIG. 2, in accordance with some embodiments.

FIG. 5 illustrates an embodiment of a prism I/O separator, such as I/O separator 220 of FIG. 2, positioned in the light path between an optical engine (not shown), such as optical engine 202, a scanning mirror, such as scanning mirror 206, and a relay optic, such as optical relay 210 of FIG. 2. The I/O separator 220 is positioned so that light input into the I/O separator 220 is incident on a first surface 222 of the I/O separator 220 at an angle greater than or equal to the critical angle θ, necessary for TIR. That is, the first surface 222 of the I/O separator 220 is angled relative to the optical path of light from the optical engine 202 such that the light from the optical engine 202 is incident on the first surface 222 at an angle greater than or equal to the critical angle necessary for TIR. The light reflected via TIR from the first surface 222 of the I/O separator is directed along an input path to scanning mirror 206. Light then reflected from the scanning mirror 206 breaks the conditions necessary for TIR as it is incident on the first surface 222 of the I/O separator 220 for a second time, thus the light is transmitted through the I/O separator to the optical relay 210, or another component along the output light path.

Figure 6:
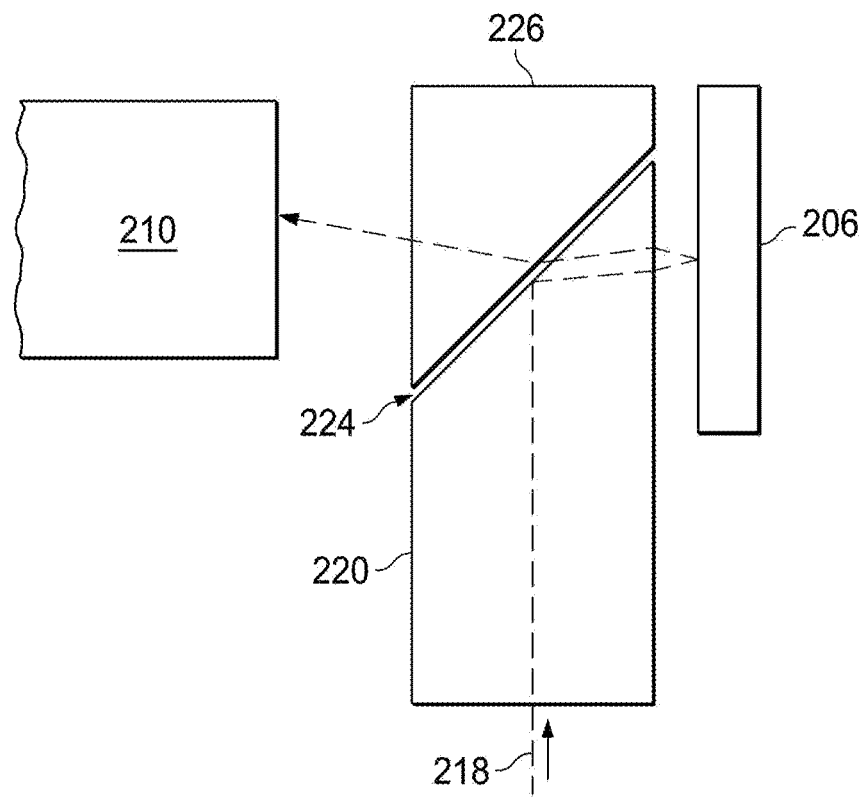
FIG. 6 shows an embodiment of the I/O separator including a prism component, in accordance with some embodiments.

FIG. 6 shows an embodiment of a prism I/O separator, such as I/O separator 220 of FIG. 2, positioned in the light path between an optical engine (not shown), such as optical engine 202, a scanning mirror, such as scanning mirror 206, and including a second prism component 226. The second prism component 226 is disposed relative to I/O separator 220 so as to form an air gap 224 between the I/O separator 220 and a second prism component 226 in order to reduce the amount of chromatic separation at the exit of the I/O separator 220 and to angle the output light nearer to perpendicular relative to the incident light. In some embodiments, I/O separator 220 is configured to reflect light from the first surface 222 such that the reflected light is incident on a second surface 628 of the I/O separator 220 nearest the scanning mirror 206 at Brewster's angle, $\theta_B = \arctan\left(\frac{n1}{n2}\right)$, where $n_1$ is the refractive index of the initial medium through which the light propagates and $n_2$ is the index of the exterior medium. When the light 218 is incident on second surface 628 at Brewster's angle, the portion of light having a first polarization state is reflected from second surface 628, while the portion of light having a second polarization state is transmitted through second surface 628 to scan mirror 206. In this manner, the portion of light having the first polarization state that is reflected from second surface 628 travels along an optical path that differs from the output path traveled by the light reflected from scan mirror 206. In some embodiments, the second prism component is the optical relay 210 configured to have an entry face with an angled surface similar to prism component 226 so as to create an air gap 224 between the optical relay 210 and the I/O separator 220.

In some situations, ghost reflections may be created by reflection of a small amount of the light incident on the surface of the I/O separator 220 nearest the scanning mirror 206. In some embodiments, the ghost reflections are reduced through the use of an anti-reflective coating on the surface of the I/O separator 220. However, this approach can result in a small amount of light from the ghost reflection being conveyed to the display.

Figure 7:
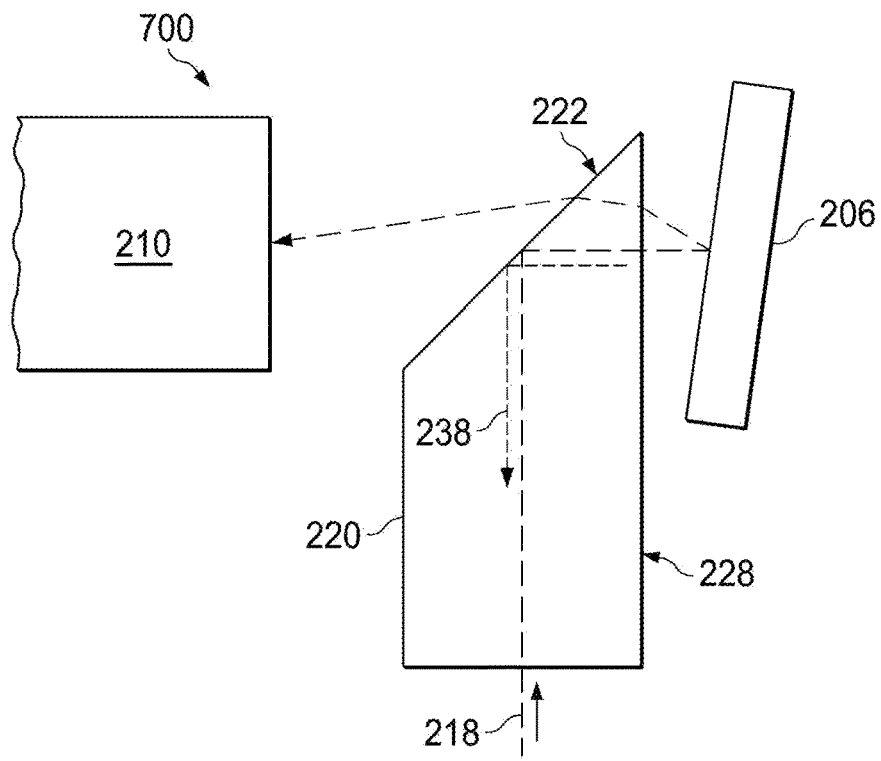
FIG. 7 shows an example embodiment of a portion of the optical scanner in which the scanning mirror is tilted in order to prevent a ghost reflection from being transmitted to the optical relay, in accordance with some embodiments.

FIG. 7 shows an example embodiment of a portion 700 of the optical scanner 202 in which the scanning mirror 206 is tilted in order to prevent ghost reflections from being transmitted to the optical relay 210. The scanning mirror 206 is positioned at an angle relative to a second surface 628 of the I/O separator 220 nearest the scanning mirror 206 such that the reflective surface of the scanning mirror 206 is nonparallel to the I/O separator surface 628 in order to direct any light reflected from the I/O separator surface 628 (i.e., a ghost reflection 238) back towards the I/O separator surface 222 within the critical angle range for TIR. Thus, the ghost reflection 238 is reflected from the I/O separator surface 222 away from the output path of the light reflected from the scanning mirror 206. That is, the majority of the light 218 input into the I/O separator 220 is transmitted through the I/O separator surface 628 to the scanning mirror

206, while a small portion of the light 218 is reflected back into the I/O separator 220 by the I/O separator surface 628. The light reflected from the I/O separator surface 628 is then incident on the I/O separator surface 222, whereupon it is reflected via TIR back towards the optical engine 202.

Figure 8:
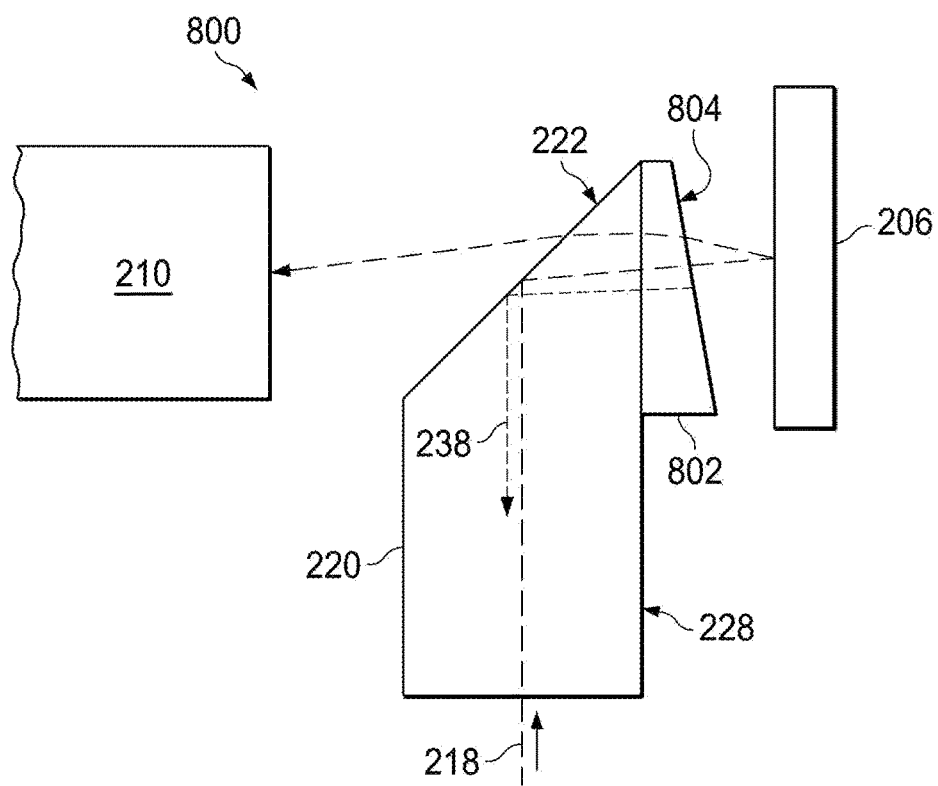
FIG. 8 shows an example embodiment of a portion of the optical scanner including a wedge prism between the scanning mirror and the I/O separator to prevent a ghost reflection from being transmitted to the optical relay, in accordance with some embodiments.

FIG. 8 shows an example embodiment of a portion 800 of the optical scanner 204 including a wedge prism 802 between the scanning mirror 206 and the I/O separator 220 in order to prevent a ghost reflection from being transmitted to the optical relay 210. In the example embodiment of FIG. 8, the scanning mirror 206 and I/O separator surface 628 are positioned to be parallel such that the majority of the light 218 input into the I/O separator 220 is transmitted through the I/O separator surface 628 and the wedge prism 802 to the scanning mirror 206. However, a small portion of the light 218 is reflected by the wedge prism surface 804 back into the wedge prism 802. The light reflected from the wedge prism surface 804 is then transmitted through the wedge prism 802 and into the I/O separator 220 where it is incident on the I/O separator surface 222 and reflected via TIR back towards the light source.

Figure 9:
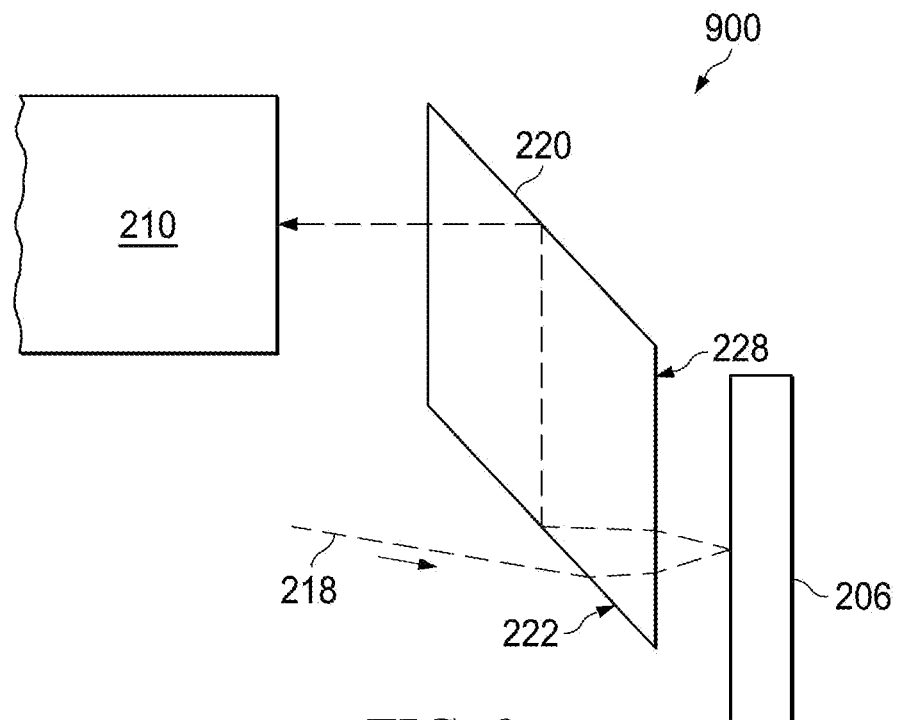
FIG. 9 shows an example embodiment of a portion of the optical scanner including a prism between the scanning mirror and the I/O separator to prevent a ghost reflection from being transmitted to the optical relay, in accordance with some embodiments.

FIG. 9 shows an example embodiment of a portion 900 of the optical scanner 204 including an I/O separator 220 formed, for example, as a parallelogram. The I/O separator 220 is configured to refract light 218 input at the first surface 222 as it is transmitted into the I/O separator such that the light is incident on the second surface 228 nearest scanning mirror 206 at an angle less than the critical angle $\theta_i$. Thus, the light is transmitted through the second surface 228 to the scan mirror 206, where the light is then reflected back into the I/O separator 220. The I/O separator 220 is further configured to reflect the light received from scanning mirror 206 at least once via TIR before the light is directed out of the I/O separator 220, typically to the optical relay 210.

In some embodiments, the I/O separator is a prism, such as illustrated in FIGS. 5-9. In some embodiments, the I/O separator is implemented as at least one layer of optical material configured to change the polarization state of light during reflection or transmission or to selectively act upon light of a specific polarization.

Figure 10:
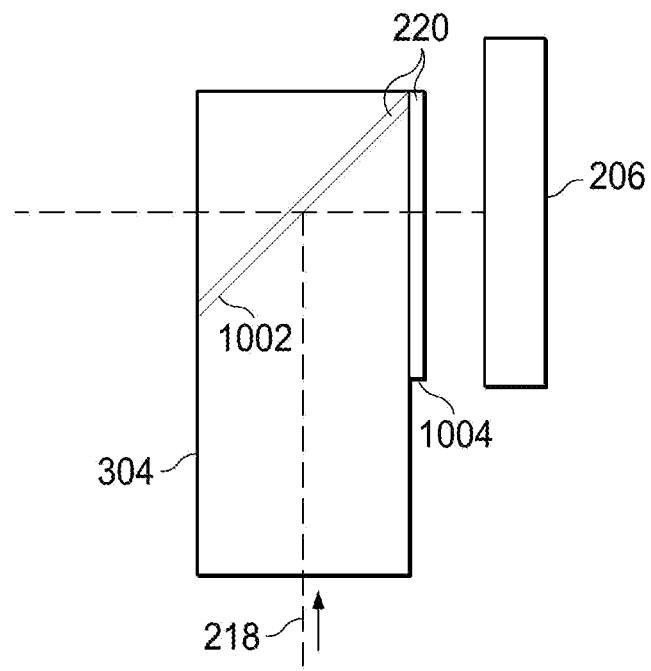
FIG. 10 shows an example I/O separator implemented on a monoblock of the optical engine. The I/O separator includes a polarizing beam splitter (PBS) and a quarter wave plate (QWP) disposed in the light path between the optical engine and the optical relay, in accordance with some embodiments.

FIG. 10 shows an example of an I/O separator 220 implemented on a monoblock 304 as a combination of a PBS 1002 and a QWP 1004 disposed in the optical light path between scanning mirror 206 and optical relay 210. PBS 1002 is configured to reflect light 218 input into the I/O separator 220 having a first polarization state (e.g., p-polarized) and to transmit light having a second polarization state (e.g., s-polarized). Thus, light having the first polarization state is input into the I/O separator 220 and is reflected at the PBS 1002 towards scanning mirror 206. QWP 1004 is positioned between the PBS 1002 and scanning mirror 206 to change the polarization of the light reflected from the scanning mirror 206 to the second polarization state so that it is transmitted through PBS 1002 when incident upon PBS 1002 a second time as it travels along the output path from scanning mirror 206. That is, the light 218 provided to scanning mirror 206 is first reflected from PBS 1002 before being reflected by scanning mirror 206, and then the light 218 is transmitted through PBS 1002 after being reflected by scanning mirror 206 and transmitted through QWP 1004. While FIG. 10 shows PBS 1002 and QWP 1004 being positioned on different surfaces of the monoblock 304, in some embodiments, PBS 1002 and QWP 1004 are disposed on the same surface of the monoblock 304 with QWP 1004 positioned between the PBS 1002 and scanning mirror 206. While FIG. 10 illustrates PBS 1002 and QWP 1004 being disposed on, or formed as part of, monoblock 304, in some embodiments, PBS 1002 and QWP 1004 are independent of monoblock 304 or positioned proximate to scan mirror 206 in a system lacking a monoblock 304.

A benefit of utilizing an I/O separator in a system with limited space, such as an HMD, is that, because the input light can be perpendicular (or nearly perpendicular) to the scanning mirror, the full aperture of the mirror can be used, allowing a larger laser beam (i.e., more optical power) to be scanned. Consequently, a smaller aperture mirror can be used, which saves electrical power because a lower mirror mass uses less driving electrical power. For example, if scanning mirror 206 measures 1.0 mm in diameter and the input and output light paths of scanning mirror 206 are separated by 35 degrees, scanning mirror 206 has a projected aperture width of 0.954 mm. On the other hand, using a PBS and QWP allows the input light path to be perpendicular to the scanning mirror (i.e., beam separation of 0 degrees), resulting in an increase in aperture width. Aperture width values for scan angles of 35 degrees and 0 degrees are shown below in Table 1. Note that the disclosed methods can also be used in systems that have multiple scanning mirrors close together, such as where the scanning mirrors are parallel to each other on opposite sides of the I/O separator 220, and such as those shown in FIG. 11 where the scanning mirrors are perpendicular to each other.

TABLE 1

| Beam Separation | nominal | +/−2.5 degrees | +/−5 degrees | +/−7.5 degrees | +/−10 degrees |
|---|---|---|---|---|---|
| 35 degrees | 0.954 mm | 0.940 mm | 0.924 mm | 0.906 mm | 0.887 mm |
| 0 degrees | 1.0 mm | 0.999 mm | 0.996 mm | 0.991 mm | 0.985 mm |
| % increase in aperture width | +4.8% | +6.3% | +7.8% | +9.4% | +11.0% |

Figure 11:
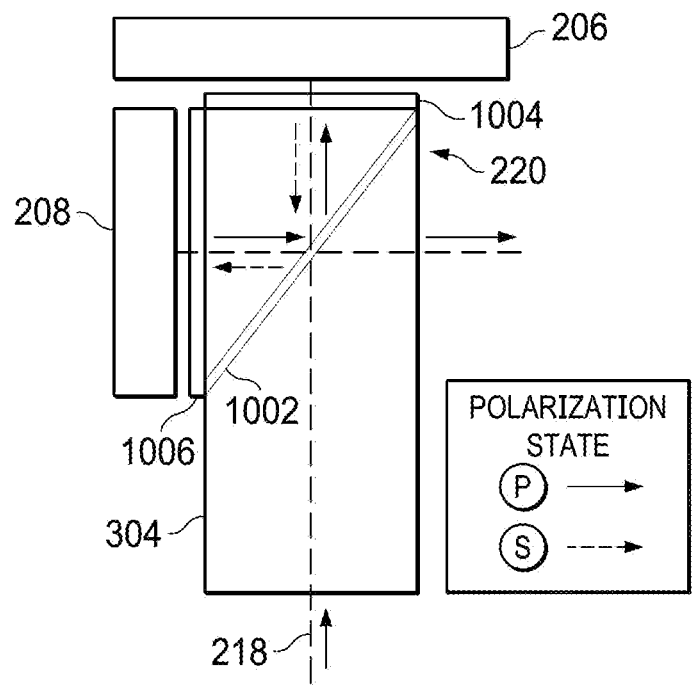
FIG. 11 shows an example I/O separator implemented on a monoblock of the optical engine. The I/O separator includes a PBS and multiple QWPs, in accordance with some embodiments.

FIG. 11 shows a diagram of an I/O separator 220 implemented on a monoblock 304 as a combination of PBS 1002 and a QWP 1004 disposed in the light path between the optical engine 202 and scanning mirror 206 and PBS 1002 and a second QWP 1006 in the light path between scanning mirror 206 and a second scanning mirror, such as scanning mirror 208 of FIG. 2. In the example shown in FIG. 10, scanning mirror 206 and scanning mirror 208 are positioned perpendicular to one another. I/O separator 220 serves to direct light 218 having a first polarization state through PBS 1002 and QWP 1004 to scanning mirror 206. The light 218 is reflected from scanning mirror 206 back through QWP 1004, where the light 218 is converted to the second polarization state. The light 218 transmitted from QWP 1004 having the second polarization state is reflected by PBS 1002 and directed through QWP 1006 to scanning mirror 208. The light 218 is reflected from scanning mirror 208 back through QWP 1006, where the light 218 is converted to the first polarization state. The light 218 having the first polarization state is transmitted through PBS 1002 and exits the monoblock 304.

There is the potential for contrast degradation in the image from reflections, particularly off the surface closest to the scanning mirror using an I/O separator implemented as a PBS and QWP, such as those described above and that shown in FIGS. 9 and 10. The reflections may be from the back surface of QWP 1004 or the monoblock 304 surface. In some embodiments, one or both of these surfaces are coated with an anti-reflection (AR) coating to reduce reflection. In addition to the AR coating, introducing an angle difference between the reflecting surface and the scanning mirror 206 nominal surface creates angular separation between the surface-reflected light and the image light (i.e., light reflected from scanning mirror) so that the surface-reflected light can be kept out of the image. To address this, in some embodiments, the shape of the monoblock 304 is angled to form a parallelogram or to form a trapezoid. In some embodiments, one or both scanning mirrors 206, 208 are angled relative to the monoblock 304. In some embodiments, an angled prism is disposed between the monoblock 304 and one or both scanning mirrors 206, 208.

Figure 12:
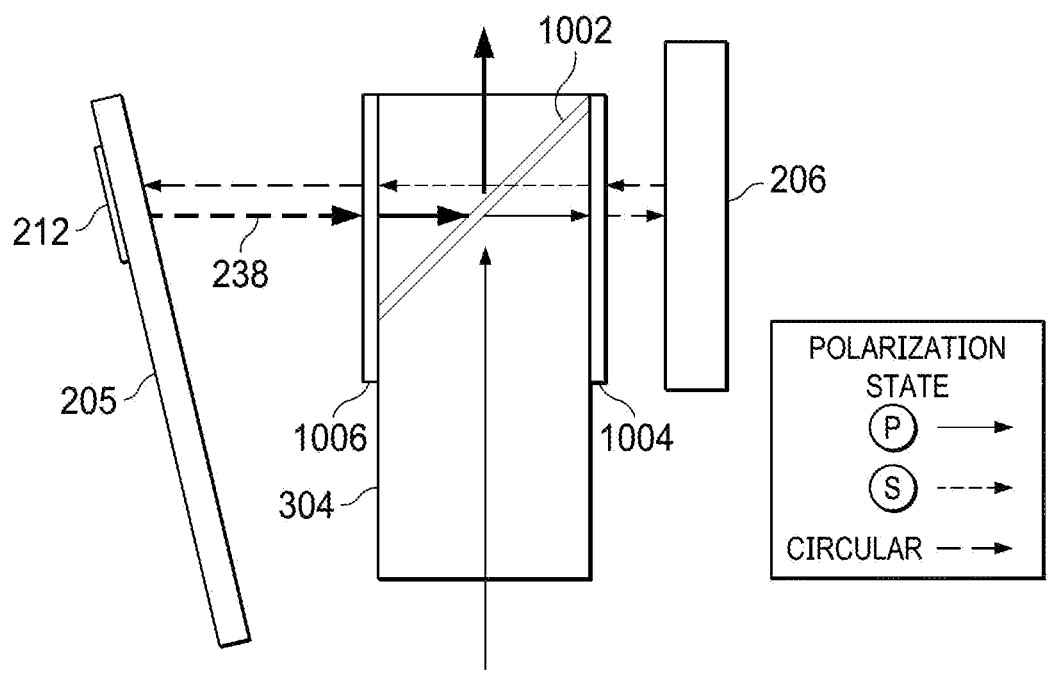
FIG. 12 shows an example I/O separator, including a PBS and a QWP, implemented on a monoblock of the optical engine to prevent reflection of light from an incoupler reaching the scanning mirror, in accordance with some embodiments.

In addition to ghost reflections created by reflection from surfaces of components within the optical scanner 204, there is the potential for ghost reflections created by light reflecting off an incoupler of a waveguide, such as incoupler 212 of waveguide 205 shown in FIG. 2. Just as PBS 1002 can be used to separate the input and output light paths from scanning mirror 206, PBS 1002 can be used to reject back-reflected light 238 from incoupler 212 before it reaches scanning mirror 206. For example, as shown in FIG. 12, the polarization of the reflected light 218 from the incoupler 212 is rotated by QWP 1004 and then reflects off PBS 1002 before reaching scanning mirror 206, thus preventing a ghost image. In some embodiments employing a single QWP, some light is reflected off scanning mirror 206, which is then reflected by PBS 1002, thus preventing the reflected light 218 from returning to incoupler 212 to create a ghost image.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
a scanning mirror;
an optical engine; and
an input/output (I/O) separator disposed between the optical engine and the scanning mirror to direct light from the optical engine towards the scanning mirror along an input path and to direct light reflected from the scanning mirror along an output path that is separated from the input path, the I/O separator further to maintain separation between the input path and output path using at least one of total internal reflection (TIR) or polarization.

2. The system of claim 1, wherein the I/O separator is a prism having a critical angle necessary for TIR and further having a first surface angled relative to an optical path of light from the optical engine such that light from the optical engine is incident on the first surface at an angle greater than or equal to the critical angle.

3. The system of claim 2, wherein light reflected from the scanning mirror along the output path is incident on the first surface at an angle less than the critical angle such that the light reflected from the scanning mirror is transmitted through the first surface.

4. The system of claim 1, further comprising:
a wedge prism having a critical angle necessary for TIR and -disposed in the input path and having a prism surface which is angled relative to the scanning mirror such that light reflected from the prism surface is directed to a first surface of the I/O separator at an angle equal to or greater than the critical angle.

5. The system of claim 1, wherein:
the I/O separator is a prism having a critical angle necessary for TIR and a first surface angled relative to an optical path of light from the optical engine such that light from the optical engine is incident on the first surface at an angle less than the critical angle; and light reflected from the scanning mirror along the output path is incident on the first surface at an angle greater than or equal to the critical angle such that the light reflected from the scanning mirror is reflected from the first surface.

6. The system of claim 5, wherein the I/O separator is configured to reflect light received from the scanning mirror at least once via TIR before directing the light out of the I/O separator.

7. The system of claim 1, wherein the I/O separator comprises a polarizing beam splitter (PBS) and at least one quarter wave plate (QWP) disposed on a monoblock of the optical engine.

8. The system of claim 7, wherein the PBS is configured to reflect light having a first polarization state and to transmit light having a second polarization state.

9. The system of claim 8, wherein light from the optical engine has the first polarization state and is reflected by the PBS, and wherein light reflected from the scanning mirror is converted to the second polarization state as it is transmitted by the QWP such that it is transmitted by the PBS.

10. A head-mounted display (HMD) system comprising:
a support structure housing a scanning mirror, an optical engine, and an input/output (I/O) separator disposed between the optical engine and the scanning mirror to direct light from the optical engine towards the scanning mirror along an input path and to direct light reflected from the scanning mirror along an output path that is separated from the input path, the I/O separator further to maintain separation between the input path and output path using at least one of total internal reflection (TIR) or polarization.

11. The HMD system of claim 10, wherein the I/O separator is a prism having a critical angle necessary for TIR and a first surface angled relative to an optical path of light from the optical engine such that light from the optical engine is incident on the first surface at an angle greater than or equal to the critical angle.

12. The HMD system of claim 11, wherein light reflected from the scanning mirror along the output path is incident on the first surface at an angle less than the critical angle such that the light reflected from the scanning mirror is transmitted through the first surface.

13. The HMD system of claim 10, further comprising:
a wedge prism having a critical angle necessary for TIR and disposed in the input path and having a prism surface which is angled relative to the scanning mirror such that light reflected from the prism surface is directed to a first surface of the I/O separator at an angle equal to or greater than the critical angle.

14. The HMD system of claim 10, wherein the I/O separator is a prism having a parallelogram shape with an entry surface and an exit surface, and wherein the entry surface is configured to refract light as it enters the entry surface at an angle that results in the light being incident on the exit surface at Brewster's angle.

15. The HMD system of claim 14, wherein the I/O separator is configured to reflect light received from the scanning mirror at least once via TIR before directing the light out of the I/O separator.

16. The HMD system of claim 10, wherein the I/O separator comprises a polarizing beam splitter (PBS) and at least one quarter wave plate (QWP) disposed on a monoblock of the optical engine.

17. The HMD system of claim 16, wherein:
the PBS is configured to reflect light having a first polarization state and to transmit light having a second polarization state,
light from the optical engine has the first polarization state and is reflected by the PBS, and
light reflected from the scanning mirror is converted to the second polarization state as it is transmitted by the QWP such that it is transmitted by the PBS.

18. An input/output (I/O) separator of a laser projector system, comprising:
a first surface configured to reflect light from an optical engine of the laser projector system along an input path, transmit light reflected from a scanning mirror of the laser projector system along an output path separated from the input path, and maintain separation between the input path and output path using at least one of total internal reflection or polarization.

19. The I/O separator of claim 18, wherein the I/O separator has a critical angle necessary for TIR, and the first surface is a prism surface disposed at an angle relative to an optical path of light from the optical engine such that light from the optical engine is incident on the first surface at an angle greater than or equal to the critical angle, and wherein light reflected from the scanning mirror is incident on the first surface at an angle less than the critical angle such that the light reflected from the scanning mirror is transmitted through the first surface.

20. The I/O separator of claim 18, wherein:
the I/O separator comprises a polarizing beam splitter (PBS) and at least one quarter wave plate (QWP) disposed on a monoblock of the optical engine,
the PBS is configured to reflect light having a first polarization state and to transmit light having a second polarization state,
light from the optical engine has the first polarization state and is reflected by the PBS, and
light reflected from the scanning mirror is converted to the second polarization state as it is transmitted by the QWP such that it is transmitted by the PBS.

* * * * *